April 2, 1963   E. R. BOWDEN   3,083,862
VALVED GASOLINE CAP

Filed Jan. 30, 1961   2 Sheets-Sheet 1

INVENTOR.
ELDRED R. BOWDEN
BY Harold B. Hood
ATTORNEY

United States Patent Office 3,083,862
Patented Apr. 2, 1963

3,083,862
VALVED GASOLINE CAP
Eldred R. Bowden, Connersville, Ind., assignor to Stant Manufacturing Company, Inc., Connersville, Ind., a corporation of Indiana
Filed Jan. 30, 1961, Ser. No. 85,787
8 Claims. (Cl. 220—44)

It is necessary that the fuel tanks of automotive vehicles be provided with vent means to permit the escape of pressure which is built up by the normal vapor pressure of the fuel contained therein and to permit the inhalation of air upon a substantial drop in temperature. Some fuel tanks are conventionally provided with vent means, intended to be permanently open, built into their roofs; but such vent means almost invariably includes a length of small-diameter tubing leading to a point relatively remote from the tank, and such tubing is subject to clogging, in road vehicles particularly, by snow, slush, dust or other foreign substances. Consequently, it is highly desirable, even in connection with such tanks, to provide a vent port in the closure cap for the filler neck thereof. Other fuel tanks are conventionally devoid of such permanent vent means; and in such instances, of course, the filler neck cap must necessarily be vented.

The violent inertial forces to which vehicles are inevitably subjected, however, produce correspondingly violent sloshing and splashing of the liquid fuel in such a tank. Changes in the attitude of vehicles also produce movement of the fuel in such tanks. Consequently, unless means is provided for guarding the vent port in a tank filler neck cap, fuel will inevitably be lost therethrough as the vehicle accelerates, decelerates, changes direction or changes attitude. This problem is particularly acute in present day road vehicles in which, in many instances, the mouth of the filler neck of the fuel tank is only slightly elevated above the top of the tank even when the vehicle is resting upon a horizontal surface. While many previous structures have been designed in an effort to provide the necessary venting in a filler neck cap and to provide, as well, means to guard against loss of fuel through the vent port, such devices with which I am acquainted have never been entirely satisfactory.

The present invention relates to a valved cap constructed and designed to accomplish the above purposes effectively and inexpensively. The primary object of the invention is to provide, in a vented cap for such a filler neck, means which will respond with a high degree of sensitivity to the movement of liquid at a point remote from a valve to shift that valve into a position effectively closing egress from the tank. A further object of the invention is to provide, in such a cap, a valve which is yieldably biased to open position, whereby the interior of the tank with which such cap is associated is normally in open communication with the atmosphere, together with means positioned for actuation by liquid approaching the port dominated by said valve to actuate said valve to close such port before the liquid reaches such port.

A further object of the invention is to provide, in a device of the character described, a collector chamber between the tank and the valve-controlled port in which any liquid which succeeds in passing the actuator means before the valve attains closed position, will be collected.

Still further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Figure 1:
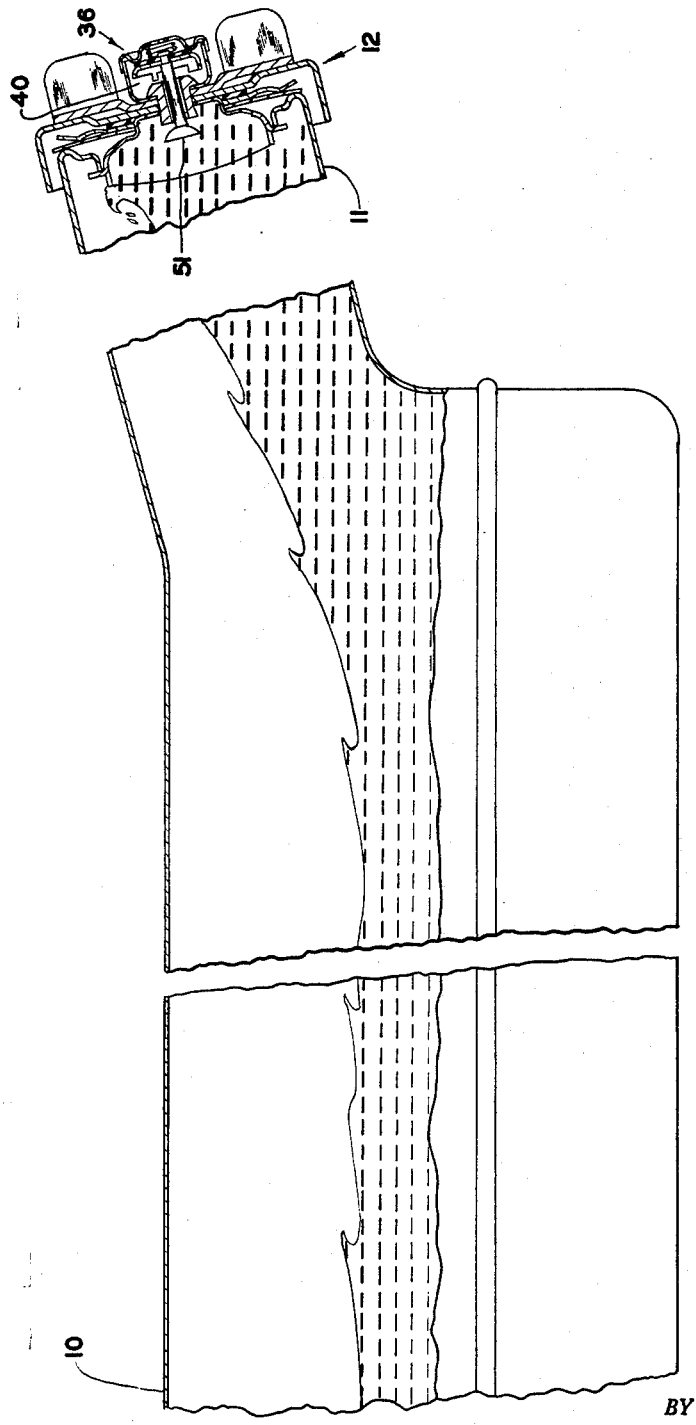
FIG. 1 is a fragmentary elevation of a conventional fuel tank for an automotive vehicle, parts being broken away to show the action of liquid within the tank under inertial forces, and illustrating an embodiment of the present invention in operative association with the filler neck thereof.

Referring more particularly to the drawings, it will be seen that I have illustrated a conventional automobile fuel tank 10 having an upwardly inclined filler neck 11 adapted to be closed by a suitable cap indicated generally by the reference numeral 12. The filler neck 11 is provided, at its mouth, with a peripheral lip 20 formed to provide a seat 21, notched at diametrically opposite points as at 22, and downturned to provide one or more cam surfaces 23 terminating in stop means 24, in accordance with conventional practice. In the drawings, I have shown that type of filler neck in which the lip 20 is inturned, and I have shown a cap construction adapted for cooperation with such an inturned lip; but it will be apparent to those skilled in the art that the invention is equally applicable to the forms of filler necks in which a similar lip is outturned.

The cap 12 comprises a discoid body 25 having depending, peripheral skirt 26. A dome 27 has its flattened base 28 positioned in engagement with the inner surface of the cap body 25 and is formed, at diametrically opposite points, with outturned fingers 29 engageable with the cam surfaces 23 to secure the cap 12 in place on the filler neck 11. Near its base, the dome is formed to provide a cylindrical journal surface 30 which terminates in a shelf or ledge 31 facing, but spaced from, the inner surface of the cap body 25.

An annular gasket 32 has its inner peripheral region supported upon the shelf 31 and journalled on the surface 30, its outer peripheral region 33 being positioned for engagement with the seat 21 of the filler neck 11. The gasket 32 is somewhat flexible, and a spring ring 34 is journalled on the surface 30 between said gasket and a further gasket 35 which bears against the inner surface of the cap body 25, the ring 34 engaging the upper surface of the gasket 32 yieldably to bias the region 33 of said gasket away from the cap body 25.

The parts thus far described are conventional and are so proportioned and designed that, when the fingers 29 are engaged with the lowermost portions of the cam surfaces 23, the outer region 33 of the gasket 32 will be resiliently pressed against the seat 21.

The vent means of the present invention is indicated generally by the reference numeral 36 and includes an upwardly opening cup or shell 37 whose base 38 bears against the outer surface of the cap body 25. A cover or closure 39 is permanently secured to the shell 37 to span the mouth thereof, thereby defining a collector chamber 40. A tubular rivet 41 penetrates the base 28 of the dome 27, the cap body 25 and the base 38 of the cup 37 to secure the dome and the cup to the cap body. Said closure 39 is formed with a port 43 which, in the assembled condition of the parts, is preferably coaxial with the bore 42 of the rivet 41.

A stem 44 is loosely reciprocably mounted in the bore 42 of the rivet 41 and, at its upper end, carries within the chamber 40 a valve indicated generally by the reference numeral 45. As shown, said valve may comprise a metal plate 46 mounted on the stem end and provided with a plurality of spaced, depending legs 47 which cooperate with the base 38 of the cup 37 to prevent the valve 45 from seating on the upper end of the rivet 41 to close the upper end of the bore 42 thereof. A compressible gasket 48 is carried on the plate 45 in cooperative relation with a seat 49 formed in the closure 39 to surround the port 43. A light, coiled spring 50 is preferably confined between the closure 39 and the gasket 48 to bias the valve 45 yieldably away from the seat 49.

As is clearly illustrated, the stem 44 projects upwardly and downwardly beyond the opposite ends of the rivet bore 42, and, at its lower end, the stem 44 carries a preferably cup-shaped abutment element 51 whose concave surface faces away from the cap body 25.

Preferably, but not necessarily, a plate 52 is fixed to the cap body 25 and carries spaced, axially projecting ears 53 to facilitate manipulation of the cap 12.

Figure 4:
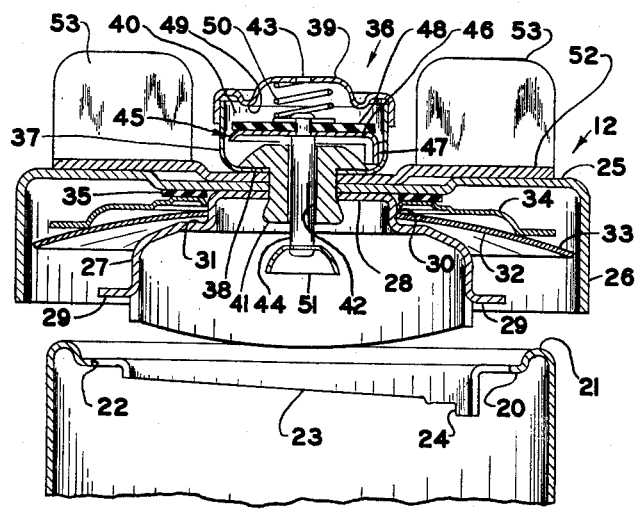
FIG. 4 is a central section through a cap constructed in accordance with the present invention, drawn to an enlarged scale, and illustrating a fragment of a conventional filler neck with which such cap is designed to be used.

When the cap 12 is seated on a conventional filler neck 11, under all normal conditions the interior of the tank 10 will be open to the atmosphere through the bore 42, chamber 40 and port 43, since the spring 50 will hold the valve 45 in its position illustrated in FIG. 4. Fuel fumes may escape to the atmosphere and air may flow into the tank freely and without affecting the valve 45.

If, however, as a result of inertial forces or otherwise, liquid splashes up into the neck 11 far enough to strike the abutment 51, as suggested in FIG. 1, the force of such moving liquid will actuate the stem 44, against the tendency of the spring 50, to move the gasket 48 into sealing engagement with the valve seat 49. The passageway through the bore 42 surrounding the stem 44 is, of course, narrowly restricted so that, while gases may flow freely therethrough, liquids can move therethrough only quite slowly; and splashing liquid, under the circumstances above suggested, cannot possibly reach the port 43 before the valve 45 is moved into sealing engagement with the seat 49.

Figure 2:
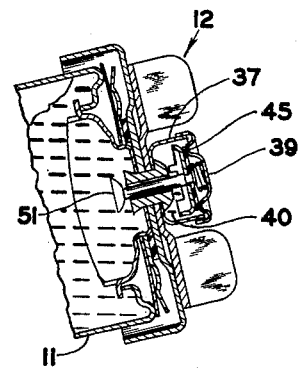
FIG. 2 is a fragmental section of the same filler neck and cap, showing a different condition of the liquid therein.

Assuming that the tank 10 is so mounted in the vehicle that the neck 11 projects rearwardly, rapid acceleration of the vehicle, when the tank is quite full, will cause the whole body of liquid fuel to move rearwardly into the neck so that a solid column of liquid will move into the dome 27, as suggested in FIG. 2. Again, that liquid will first strike the abutment 51 so that the valve 45 will be quickly moved into sealing engagement with the seat 49. In this instance, liquid will flow through the passage 42 around the stem 44 and may fill the chamber 40; but the inertial effect of liquid in the chamber 40 against the valve 45, which has been closed before the chamber 40 is filled with liquid, will simply add to the force holding the valve against its seat.

Figure 3:
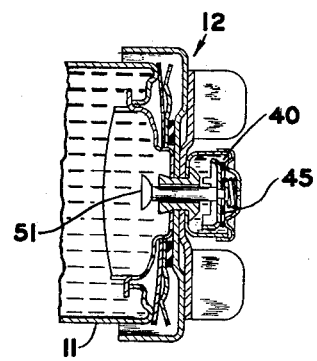
FIG. 3 is a similar fragmentary section illustrating conditions which obtain when the vehicle with which the tank is associated is on a sharp incline.

Under the same assumption, it will be apparent that, if the vehicle is driven up a steep grade, or is parked on such a grade facing upwardly, the neck 11 will again be filled with liquid, as suggested in FIG. 3. Again, however, as the liquid enters the dome 27, it will strike the abutment 51 to move the valve 45 to closed position before any substantial quantity of liquid can enter the chamber 40. Thus, as the chamber 40 fills, the weight of liquid against the valve 45 will simply tend to increase the sealing pressure of the valve against the seat 49.

It will be obvious, of course, that under the conditions suggested in FIG. 1, the valve 45 will be only momentarily closed and will be reopened by the spring 50 as soon as the force of the liquid against the abutment 51 is removed. Under the conditions suggested in FIG. 2, the valve will remain closed until the force of the liquid against the abutment member 51 has been removed and until enough liquid has drained from the chamber 40 back into the tank so that none can escape through the port 43. Thereafter, the spring 50 will reopen the valve. The same action will occur after the condition suggested in FIG. 3 has been changed.

Figure 5:
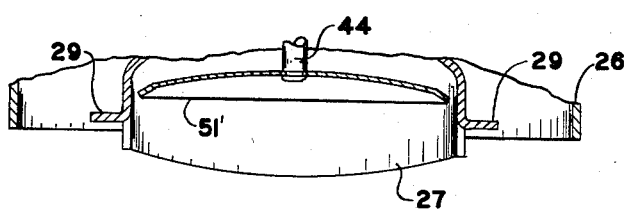
FIG. 5 is a fragmentary section of a similar cap illustrating a modified embodiment of my invention.

It will be apparent that the sensitivity of the valve actuating mechanism may be varied, as desired, by calibration of the spring 50 and/or by substitution of a different size of abutment element for the element 51. Such a substitution is suggested in FIG. 5 in which a much larger abutment element 51' is shown mounted upon the lower end of the stem 44.

I claim as my invention:

1. A valved cap primarily for vehicle fuel tanks comprising a cap body having a vent port therethrough, a housing secured to the external surface of said cap body and defining a chamber into which said vent port opens, said chamber being otherwise closed except for an opening in a wall of said housing opposed to said vent port, a valve seat surrounding said opening, a stem reciprocably penetrating said port, a valve carried by said stem within said chamber and movable therewith into and out of sealing engagement with said seat, said valve being yieldably biased away from said seat, and abutment means carried by said stem adjacent its end which is disposed internally of said cap body.

2. A valved cap primarily for vehicle fuel tanks comprising a cap body provided with means defining a chamber having a first port opening inwardly from said cap body and a second port opening outwardly from said cap body, a stem reciprocably mounted in said first port and having one end disposed within said chamber and its other end projecting inwardly relative to said cap body beyond said first port, a valve seat within said chamber surrounding said second port, a valve carried by said one end of said stem within said chamber and movable into and out of sealing engagement with said seat, said valve being yieldably biased away from said seat, and abutment means carried by said stem adjacent said other end of said stem.

3. The cap of claim 2 in which said abutment means is cup shaped with its concave surface facing away from said chamber.

4. The cap of claim 2 in which a coiled spring is confined between said valve and the chamber wall in which said second port is formed, to provide such yieldable bias for said valve.

5. The cap of claim 4 in which said abutment means is cup shaped with its concave surface facing away from said chamber.

6. A valved cap primarily for vehicle fuel tanks comprising a generally discoid cap body having a perimetral, depending skirt, an element coaxially arranged adjacent the lower surface of said cap body and formed to provide a journal surface coaxial with said body and a shelf axially spaced below said body, an annular gasket having its inner, peripheral region supported on said shelf and journalled on said journal surface, the outer, peripheral region of said gasket being yieldably biased away from said cap body, an upwardly-opening cup having its base seated on the upper surface of said cap body, a tubular rivet penetrating said cap body, said element and the base of said cup to secure said element and said cup to said cap body, a closure for said cup, said closure being formed with a port surrounded by a valve seat facing the base of said cup, a stem loosely reciprocably mounted in the bore of said rivet and projecting therefrom above and below said bore, a valve carried at the upper end of said stem and movable into and out of sealing engagement with said seat, a coiled spring confined between said valve and said closure to bias said valve yieldably away from said seat, and abutment means carried at the lower end of said stem.

7. The combination with a filler neck of a liquid-containing tank, said filler neck having a mouth, a peripherally-extending lip surrounding said mouth and providing, at a rim of said lip, a cam surface inclining toward said tank as it progresses peripherally in one direction, of a closure cap for said filler neck comprising a cap body constructed and arranged to close said mouth, retainer means carried by said body and cooperatively engageable with said lip cam surface to retain said cap body in closing association with said mouth, said cap body being provided with means defining a chamber having a first port opening inwardly from said cap body and a second port opening outwardly from said cap body, a stem reciprocably mounted in said first port and having one end disposed within said chamber and its other end projecting inwardly relative to said cap body beyond said first port, a valve seat within said chamber surrounding said second port, a valve carried by said one end of said stem within said chamber and movable into and out of sealing engagement with said seat, said valve being yieldably biased away from said seat, and abutment means carried by said stem adjacent said other end of said stem.

8. The combination with a filler neck of a liquid-containing tank, said filler neck having a mouth, a peripherally-extending lip surrounding said mouth and providing an annular seat and, at a rim of said seat, a cam surface inclining toward said tank as it progresses peripherally in one direction, of a closure cap for said filler neck comprising a cap body constructed and arranged to span said mouth, an element coaxially arranged adjacent the inner surface of said cap body and formed to provide a journal surface coaxial with said body and a shelf axially spaced from said body, an annular gasket having its inner, peripheral region supported on said shelf and journalled on said journal surface, the outer, peripheral region of said gasket being yieldably biased away from said cap body, retainer means carried by said body and cooperatively engageable with said lip cam surface to retain said cap body in place on said filler neck, said parts being so constructed and arranged that, when said retainer means is engaged with that portion of said cam surface most remote from said seat, the outer peripheral region of said gasket will be resiliently pressed against said seat, an upwardly-opening cup having its base seated on the outer surface of said cap body, a tubular rivet penetrating said cap body, said element and the base of said cup to secure said element and said cup to said cap body, a closure for said cup, said closure being formed with a port surrounded by a valve seat facing the base of said cup, a stem loosely reciprocably mounted in the bore of said rivet and projecting therefrom above and below said bore, a valve carried at the upper end of said stem and movable into and out of sealing engagement with said seat, a coiled spring confined between said valve and said closure to bias said valve yieldably away from said seat, and abutment means carried at the lower end of said stem.

References Cited in the file of this patent

UNITED STATES PATENTS

| | | |
|---|---|---|
| 1,990,621 | Stant | Feb. 12, 1935 |
| 2,860,656 | Eshbaugh | Nov. 18, 1958 |
| 2,874,867 | Schultz | Feb. 24, 1959 |